(12) United States Patent
Filippi et al.

(10) Patent No.: US 10,647,587 B2
(45) Date of Patent: May 12, 2020

(54) PROCESS FOR THE AMMONIA PRODUCTION

(71) Applicant: Casale SA, Lugano (CH)

(72) Inventors: Ermanno Filippi, Castagnola (CH); Raffaele Ostuni, Lugano (CH)

(73) Assignee: Casale SA, Lugano (CH)

( * ) Notice: Subject to any disclaimer, the term of this patent is extended or adjusted under 35 U.S.C. 154(b) by 106 days.

(21) Appl. No.: 15/552,054

(22) PCT Filed: Jan. 27, 2016

(86) PCT No.: PCT/EP2016/051658
§ 371 (c)(1),
(2) Date: Aug. 18, 2017

(87) PCT Pub. No.: WO2016/131623
PCT Pub. Date: Aug. 25, 2016

(65) Prior Publication Data
US 2018/0044192 A1 Feb. 15, 2018

(30) Foreign Application Priority Data

Feb. 20, 2015 (EP) ..................... 15156001

(51) Int. Cl.
*C01C 1/04* (2006.01)
*C01B 3/02* (2006.01)
(Continued)

(52) U.S. Cl.
CPC ............... *C01C 1/0441* (2013.01); *B01J 8/06* (2013.01); *C01B 3/025* (2013.01); *C01C 1/0405* (2013.01);
(Continued)

(58) Field of Classification Search
CPC ... C01C 1/0441; C01C 1/0476; C01C 1/0405; C22C 38/40; C22C 38/00; B01J 8/06;
(Continued)

(56) References Cited

U.S. PATENT DOCUMENTS 4,077,780 A * 3/1978 Doshi ................. B01D 53/047
95/100
4,213,954 A * 7/1980 Pinto ..................... C01C 1/0405
422/148
(Continued)

FOREIGN PATENT DOCUMENTS

| EP | 2316792 A1 | 5/2011 |
|---|---|---|
| RU | 2261225 C2 | 9/2005 |
| SU | 1770277 A1 | 10/1992 |

OTHER PUBLICATIONS

International Search Report issued in connection with PCT/EP2016/051658.
International Preliminary Report on Patentability issued in connection with PCT/EP2016/051658.

*Primary Examiner* — Anthony J Zimmer
(74) *Attorney, Agent, or Firm* — Akerman LLP

(57) ABSTRACT

Process and plant for the synthesis of ammonia from a hydrocarbon feedstock, comprising: primary reforming with steam and air-fired secondary reforming wherein primary reforming is performed at a temperature and pressure of at least 790° C. and 50 bar, and secondary reforming is carried out substantially in absence of excess air, the so obtained make-up synthesis gas having a $H_2$ to $N_2$ molar ratio in the range 2.5 to 3.

12 Claims, 1 Drawing Sheet

(51) Int. Cl.
*C22C 38/40* (2006.01)
*C22C 38/00* (2006.01)
*B01J 8/06* (2006.01)

(52) U.S. Cl.
CPC ............ *C01C 1/0476* (2013.01); *C22C 38/00* (2013.01); *C22C 38/40* (2013.01); *B01J 2208/02* (2013.01); *B01J 2208/06* (2013.01); *C01B 2203/0233* (2013.01); *C01B 2203/0244* (2013.01); *C01B 2203/0405* (2013.01); *C01B 2203/0415* (2013.01); *C01B 2203/0495* (2013.01); *C01B 2203/068* (2013.01); *C01B 2203/142* (2013.01); *C01B 2203/84* (2013.01); *Y02P 20/52* (2015.11)

(58) Field of Classification Search
CPC ... B01J 2208/02; B01J 2208/06; C01B 3/025; C01B 2203/84; C01B 2203/142; C01B 2203/068; C01B 2203/0495; C01B 2203/0415; C01B 2203/0244; C01B 2203/0233; C01B 2203/0405; Y02P 20/52
See application file for complete search history.

(56) References Cited

U.S. PATENT DOCUMENTS

| | | |
|---|---|---|
| 4,224,298 A | 9/1980 | Robinson |
| 4,687,498 A | 8/1987 | MacLean et al. |
| 2008/0164442 A1 | 7/2008 | Nataraj et al. |
| 2010/0303703 A1 | 12/2010 | Filippi et al. |
| 2012/0207663 A1* | 8/2012 | Lob ................. C01C 1/0476 423/359 |
| 2013/0039835 A1* | 2/2013 | Ostuni ................. C01B 3/025 423/359 |

* cited by examiner

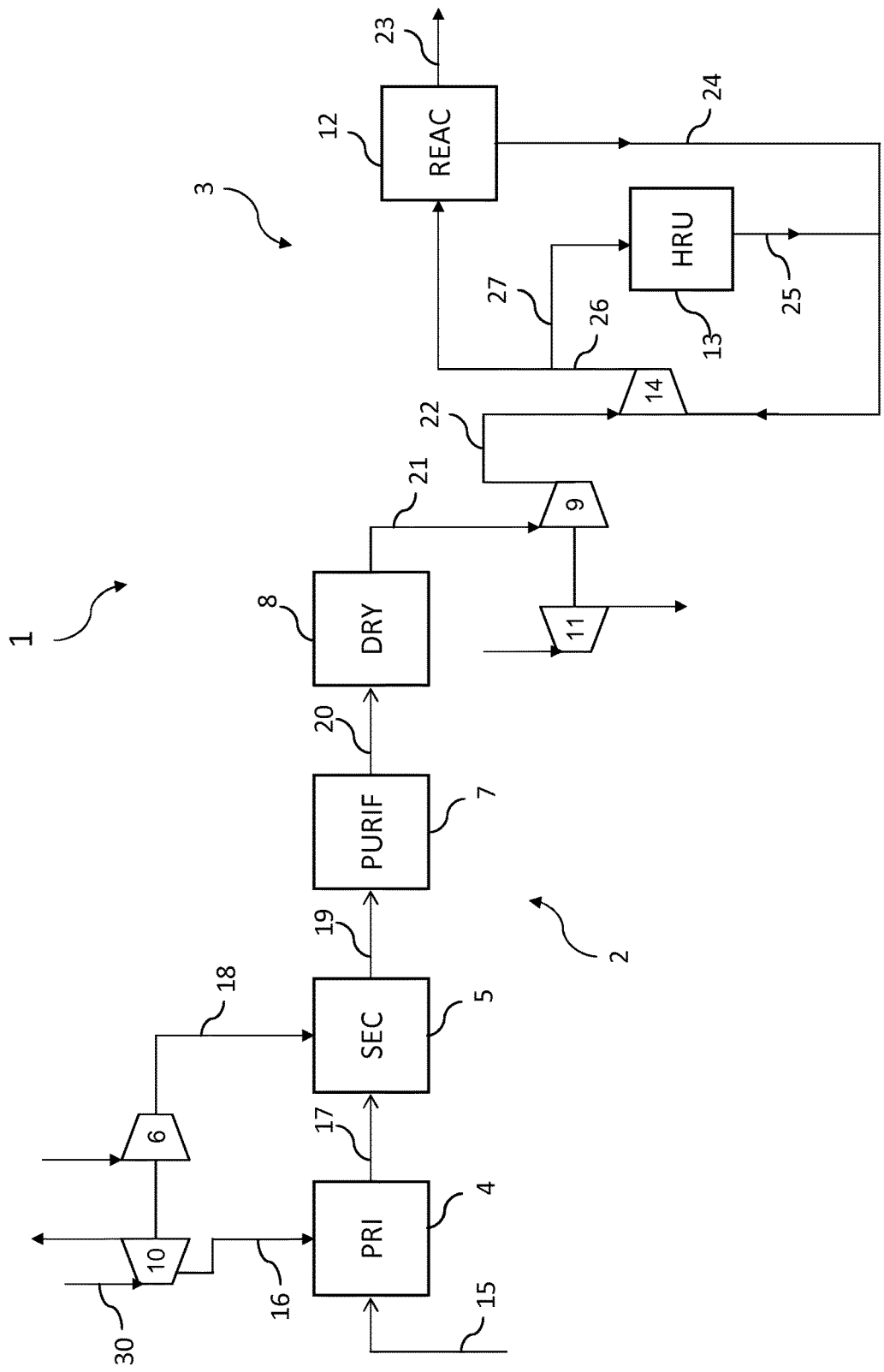

PROCESS FOR THE AMMONIA PRODUCTION

This application is a national phase of PCT/EP2016/051658, filed Jan. 27, 2016, and claims priority to EP 15156001.8, filed Feb. 20, 2015, the entire contents of both of which are hereby incorporated by reference.

FIELD OF THE INVENTION

The present invention relates to a process for the ammonia production by catalytic reaction of a make-up synthesis gas which is produced by reforming a hydrocarbon feedstock.

PRIOR ART

The industrial production of ammonia involves the catalytic reaction of a synthesis gas ("make-up gas") comprising hydrogen and nitrogen inside a high-pressure (HP) synthesis loop operating usually at about 80-300 bar.

The make-up gas is produced in a frontend section, upstream the HP synthesis loop, by reforming of a hydrocarbon feedstock.

The synthesis of ammonia from a hydrocarbon feedstock comprises basically: primary reforming with steam; secondary reforming with an oxidant, obtaining a raw gas product; purification of said raw gas product, obtaining a make-up synthesis gas; conversion of said make-up synthesis gas into ammonia in a high-pressure synthesis loop.

Purification may include shift conversion of carbon monoxide into carbon dioxide, removal of carbon dioxide and optionally methanation. The purified synthesis gas is compressed in a multi-stage gas compressor to feed the synthesis loop. Said gas compressor is normally driven directly by a steam turbine.

Said step of primary reforming is carried out in a bundle of externally heated tubes filled with a catalyst (catalytic tubes).

In order to reduce the maximum operating temperature of said catalytic tubes, the prior art teaches to carry out the step of secondary reforming with oxygen or enriched air. However, production of oxygen or enrichment of air requires an air separation unit and consumes energy, thus being expensive.

An alternative prior art technique to keep a relatively low temperature of the tubes, without the need of oxygen or air enrichment, is carrying out an air-fired secondary reforming with a significant excess of air compared to the theoretical stoichiometric amount. The theoretical stoichiometric amount of air is the amount of air which is required to obtain a $H_2$ to $N_2$ molar ratio of 3 in the purified make-up gas which is sent to ammonia synthesis.

A drawback of this technique, however, is the introduction of a large quantity of nitrogen in the front-end. This causes a large flow rate which requires larger and more expensive piping. In addition, the main syngas compressor and its driving turbine may become a bottleneck of the plant when dealing with a very large capacity, e.g. more than 3,000 MTD (metric tons per day).

In case of such a large capacity, the gas compressor would be required to process a relevant flow rate and produce a large compression ratio. The large steam flow through said turbine, in order to drive the compressor, would require a large rotor diameter unable to reach the elevated speed (e.g. 10,000 rpm) required by the compressor, mainly due to limitations dictated by the excessive tip speed of the blades of low-pressure stages of the turbine. It follows that the maximum capacity of the ammonia plant, in terms of ammonia that can be synthesized, is substantially limited by the capacity of the synthesis gas compressor-turbine assembly.

Prior art solutions to avoid this drawback are not satisfactory. For example introduction of a gear stage between the compressor and the turbine is undesirable because of lower reliability and loss of efficiency. Other attempts to overcome this problem include: introduction of an inter-stage reactor to produce some ammonia, which however increases cost and complication; use of a lower synthesis pressure which however adversely affects the synthesis.

It is also known to take a purge stream from the HP synthesis loop in order to remove inert gases that otherwise may accumulate and lower the overall efficiency. EP 2 316 792 discloses the recovery of hydrogen from said purge stream and use of the recovered hydrogen to balance the excess of nitrogen. However, due to large amount of air introduced in the secondary reforming, the required amount of hydrogen is large which implies the use of expensive separation techniques such as cryogenic, TSA or PSA.

SUMMARY OF THE INVENTION

The aim of the invention is to overcome the aforementioned drawbacks and limitations of the prior art.

This aim is reached with a process for the synthesis of ammonia from a hydrocarbon feedstock, comprising:
a step of primary reforming of said hydrocarbon feedstock with steam obtaining a first reformed gas;
a step of air-fired secondary reforming of said first reformed gas, obtaining a raw gas product;
purification of said raw gas product obtaining a make-up synthesis gas;
conversion of said make-up synthesis gas into ammonia in a synthesis loop;
characterized in that said primary reforming is performed at a temperature of at least 790° C. and pressure of at least 50 bar; said step of secondary reforming is carried out substantially in absence of excess air compared to the stoichiometric amount of air, and said make-up synthesis gas has a $H_2$ to $N_2$ molar ratio in the range 2.5 to 3.

Said values of temperature and pressure are referred to the process gas at the exit of the catalytic tubes of the primary reforming.

Preferably the above mentioned temperature of at least 790° C. is greater than 800° C.

Preferably, said $H_2$ to $N_2$ molar ratio is in the range 2.6 to 2.8.

As mentioned above the stoichiometric amount of air is understood as the amount which is necessary to achieve $H_2$ to $N_2$ molar ratio of 3 in the make-up gas admitted to the synthesis loop, i.e. it depends substantially on the amount of hydrogen $H_2$ of said make-up gas. The substantially absence of excess air shall be understood as an amount of air which results in the $H_2$ to $N_2$ molar ratio being 2.5 or greater.

Preferably, the conversion of make-up synthesis gas into ammonia is carried out at a loop pressure which is 2 to 3.5 times the pressure of the process gas at the exit of the primary reforming catalytic tubes. Said loop pressure is understood as the delivery pressure of a circulator of the loop. More preferably loop pressure is in the range 100 to 200 bar, and even more preferably 120 to 150 bar.

An aspect of the invention is to increase primary reforming temperature and pressure while using no excess air compared to the stoichiometric amount. Air admitted to the secondary reforming is substantially in the stoichiometric amount or in a small excess and, as a consequence, the $H_2$ to $N_2$ molar ratio is equal to or slightly less than 3. The process does not require excess air, or $O_2$-enriched air.

In a particularly preferred embodiment, the catalytic tubes of the primary reforming are made of an alloy chosen among the following:
GX45NiCrSiNbTi3525, GX40NiCrSiNb3525 (according to EN 10027 classification);
HP alloys, HP mod alloys, HP mod Microalloy, HP Nb Microalloy, HP microalloy, HK microalloy (ASTM A-608 and ASTM A-297 classification).

The above materials are suitable to operate at the elevated pressure and temperature of the invention.

In some embodiments, the process of the invention includes extraction from said loop of a purge stream, separation of a hydrogen-containing stream from said purge stream and addition of said hydrogen-containing stream to said make-up gas in order to adjust said $H_2$ to $N_2$ ratio. When the syngas is produced with a $H_2$ to $N_2$ molar ratio less than 3, said hydrogen-containing stream is used to adjust said ratio to a value equal or closer to 3.

An advantage of the invention is that less hydrogen is required to adjust the $H_2$ to $N_2$ ratio, due to the ratio being close to 3, and therefore less expensive techniques for separation of hydrogen can be used, for example a membrane hydrogen recovery unit. The applicant has surprisingly found that, even if $H_2$ and $N_2$ recovery rates of a membrane recovery unit are lower than a cryogenic recovery unit, due to the high pressure of the permeate, the process performances are still attractive.

The synthesis loop includes a circulation compressor (also named circulator). According to an embodiment of the invention, the delivery of the main gas compressor is sent to the suction side of said circulation compressor of the loop. An advantage is that the duty of the main compressor is reduced since part of the compression is given by the circulator.

In a further preferred embodiment, the synthesis gas is subjected to a drying treatment by means of ammonia washing, before the compression in the main compressor or between two stages of compression.

The main advantage of the invention is the reduced duty of the main syngas compressor. The power absorbed by the compressor, for a given capacity, is reduced accordingly. Hence, the invention allows reaching a large capacity, for example more than 3,000 MTD without exceeding the above mentioned limits of the steam turbine coupled to the syngas compressor, i.e. keeping the direct drive between the syngas compressor and the turbine. For example the invention allows reaching a capacity of 4,000 MTD.

In some embodiments of the invention, the air compressor (instead of the syngas compressor) becomes the largest power user. Accordingly, the highest pressure available steam is used to drive the steam turbine coupled to said air compressor; steam discharged by, or extracted from, said turbine is preferably used for the primary reforming.

This is advantageous as regards the efficiency of the process, because air compression can be achieved much more efficiently than syngas compression. This is mainly due to the possibility to use an air compressor of the integrally geared type, which is unsuitable for the synthesis gas.

Moreover, the speed of the air compressor (revolutions per minute) is lower than that of the syngas compressor: hence there is no limitation to the size of the steam turbine coupled with the air compressor.

Another embodiment of the invention is to expand more steam than required by the process air compressor in said steam turbine. Accordingly, the turbine coupled to the air compressor may also drive a generator to produce electric power.

According to a preferred embodiment, the reforming process, including the primary reforming and air-fired secondary reforming, is operated with a global steam-to-carbon ratio equal to or greater than 2.9. The global steam-to-carbon ratio denotes the overall ratio of steam and carbon admitted to the reforming process.

Such relatively high steam-to-carbon ratio is beneficial to the conversion of the feedstock and subsequent shift of carbon monoxide. It is also synergistic with the elevated pressure of the primary reforming, namely at least 50 bar. Compared to a conventional reforming, the increased amount of steam (due to higher steam-to-carbon ratio) implies that more heat is recoverable from the reforming process at a high temperature, and can be made available for a further use internally the front-end, for example for regeneration of a solution for CO2 absorption. Hence the energy efficiency of the front-end is improved, reducing e.g. the need of heat input.

An aspect of the invention is also a plant suitable to carry out the above described process.

In particular, an aspect of the invention is a plant for the synthesis of ammonia wherein the primary reforming section includes a tube reformer with tubes filled of catalyst, and said tubes are made of
one of the above mentioned alloys.

The advantages will be more evident from the following detailed description.

BRIEF DESCRIPTION OF THE DRAWINGS

FIG. 1 is a scheme of a plant for the synthesis of ammonia according to an embodiment of the invention.

DETAILED DESCRIPTION

FIG. 1 illustrates a block scheme of a plant 1 for the synthesis of ammonia comprising a front-end section 2 and an ammonia synthesis loop 3. The front-end 2 produces a make-up synthesis gas 21 which is compressed in a gas compressor 9 and is fed to the to the ammonia synthesis loop 3.

The front-end section 2 comprises: a primary reformer 4; a secondary reformer 5; an air compressor 6; a purification section 7; a gas drying unit 8. The air compressor 6 and the synthesis gas main compressor 9 are directly driven by respective steam turbines 10 and 11. The air compressor 6 is preferably of the integrally geared type.

The loop 3 comprises a block 12 comprising at least one catalytic reactor, a gas cooler and a liquid separator to produce liquid ammonia 23. Unreacted gas 24 is re-circulated in the loop 3 by a further compressor 14, also referred to as circulator.

A hydrocarbon feedstock 15, such as natural gas, and steam 16 catalytically react in the primary reformer 4 at a temperature of at least 790° C. and a pressure of at least 50 bar.

The partially reformed gas 17 leaving the primary reformer 1 further reacts in the secondary reformer 5 with the aid of an air supply 18 delivered by the air compressor 6.

The turbine 10 driving the air compressor 6 is powered by a high pressure steam 30 which is preferably generated in the ammonia plant 1, e.g. by recovering heat from exhaust fumes of the convective section of the primary reformer. According to a preferred embodiment, the steam 16 for the primary reforming is extracted from said turbine 10.

In some embodiments, the amount of steam 30 exceeds the amount which is necessary to power the compressor 6. Hence, the turbine 10 may be coupled also to a generator, to produce electric power.

The fully reformed gas 19 leaving the secondary reformer 5 is treated in the purification section 7, for example by shift conversion, removal of carbon dioxide and methanation, resulting in a purified synthesis gas 20. Said gas 20 is further sent to the drying unit 8 for the removal of water contained therein, obtaining a substantially anhydrous stream 21. Said drying unit 8 is preferably an ammonia washing unit.

Said stream 21 has a hydrogen/nitrogen molar ratio of 2.5 to 3 according to the invention.

Said stream 21 is sent to the suction side of the synthesis gas main compressor 9 and the resulting high-pressure synthesis gas 22 is preferably fed to the circulator 14, as shown.

A purge stream 27 containing unreacted hydrogen and nitrogen and inert gases (e.g. argon and methane) is extracted from the loop 3, for example from the delivery stream 26 of the circulator 14. Said purge stream 27 is sent to a hydrogen recovery unit 13 to separate a hydrogen-rich gaseous stream 25, which is returned to the suction of circulator 14, where it is mixed with the stream 24. This hydrogen-rich gaseous stream 25 serves to adjust the $H_2$ to $N_2$ ratio, in particular when the ratio of streams 21 and 22 (as produced by the front-end 2) is lower than 3. By adding hydrogen separated from the purge stream 27, said ratio is adjusted to 3, or close to 3, as required for the synthesis of ammonia.

The invention claimed is:

1. A process for the synthesis of ammonia from a hydrocarbon feedstock, the process comprising:
    a step of primary reforming of said hydrocarbon feedstock with steam obtaining a first reformed gas,
    a step of air-fired secondary reforming of said first reformed gas, obtaining a raw gas product,
    purification of said raw gas product obtaining a make-up synthesis gas,
    conversion of said make-up synthesis gas into ammonia in a synthesis loop,
    wherein:
    said primary reforming is performed at a temperature of at least 790° C. and pressure of at least 50 bar;
    said step of secondary reforming is carried out substantially in absence of excess air relative to the stoichiometric amount;
    said make-up synthesis gas has a $H_2$ to $N_2$ molar ratio of 2.5 or greater but less than 3 and the process includes extraction from said loop of a purge stream, separation of a hydrogen-containing stream from said purge stream and addition of said hydrogen-containing stream to said make-up gas in order to adjust said $H_2$ to $N_2$ ratio.

2. The process according to claim 1, wherein primary reforming is carried out in tubes filled with catalyst, and said tubes are made of an alloy chosen among the following:
    GX45NiCrSiNbTi3525 or GX40NiCrSiNb3525 according to EN 10027 classification, or HP alloys, HP mod alloys, HP mod Microalloy, HP Nb Microalloy, HP microalloy, HK microalloy according to ASTM A-608 and ASTM A-297 classification.

3. The process according to claim 1, said $H_2$ to $N_2$ molar ratio being in the range 2.6 to 2.8.

4. The process according to claim 1, said conversion of make-up synthesis gas into ammonia being carried out at a pressure which is 2.0 to 3.5 times the pressure of the primary reforming.

5. The process according to claim 4, said conversion of make-up synthesis gas into ammonia being carried out at a pressure in the range 100 to 200 bar.

6. The process according to claim 1, said separation being carried out with a membrane hydrogen recovery unit.

7. The process according to claim 1, comprising a step of compression of said make-up gas in a gas compressor, said synthesis loop includes a circulation compressor and delivery of said gas compressor is sent to the suction side of said circulation compressor of the loop.

8. The process according to claim 1, wherein an air feed for the secondary reforming is compressed in an air compressor which is powered by a steam turbine, said steam turbine being fed with a high-pressure steam and steam for said step of primary reforming is extracted from said turbine.

9. The process according to claim 8, wherein said steam turbine expands steam in excess with respect to the steam required for the air compressor, and drives a generator to produce electric power.

10. The process according to claim 1, wherein said purified synthesis gas is subjected to a drying treatment by means of ammonia washing.

11. The process according to claim 1, wherein the reforming process, which includes said steps of primary reforming and air-fired secondary reforming, is operated with a global steam-to-carbon ratio equal to or greater than 2.9.

12. The process according to claim 5, said conversion of make-up synthesis gas into ammonia being carried out at a pressure in the range 120 to 150 bar.

\* \* \* \* \*